Patented June 30, 1936

2,046,267

UNITED STATES PATENT OFFICE 2,046,267

PIGMENTS

Frank Willard Johnson, Pennsgrove, N. J., assignor to E. I. du Pont de Nemours & Company, Wilmington, Del., a corporation of Delaware No Drawing. Application August 24, 1933, Serial No. 686,653

8 Claims. (Cl. 134—58.5)

This invention relates to cellulosic pigments more particularly finely divided regenerated cellulose particles suitable for use as pigments, and a process for the production thereof.

The term "pigment" as herein used refers to insoluble colored particles in a state of subdivision which are useful in the production of paints, printing inks, printing of wall paper and other applications in which affinity for the substance treated is not a requisite. In this latter respect, pigments and dyes differ since it is essential from the standpoint of dyeing that the dye have affinity for the substance to which it is applied, e. g., mordanted or unmordanted fibers, or in lieu thereof that it be applied in soluble form and then precipitated. The physical state of a pigment is all-important from the standpoint of its use while that of a colored compound to be used in dyeing a material such as cotton may or may not be important depending upon the particular type of dye and the method of application. Obviously, all pigments are not suitable for use as dyes; nor are all dyes suitable for use as pigments.

The preparation of pigments has attained a highly developed status in the art. In particular, the pigment art has sought to attain the maximum brilliancy of shade with the minimum amount of coloring material. The difficulties and the problems encountered may vary widely with the type of color compounds. Thus, vat color compounds, in general, are noteworthy for their extraordinary light fastness but present many difficulties for pigment preparation because of their poor tinctorial power.

Pigmented cellulose esters (nitrocellulose, acetyl cellulose) and cellulose ethers (ethyl cellulose) have been prepared by precipitating a suitable color on a fibrous pulp of the ester or ether. When the colored soluble cellulose is dissolved in a suitable solvent the coloring material is dispersed in the solution without the necessity for grinding or similar dispersing treatments.

Pigments have also been prepared by powdering wood and coloring it with a soluble color such as eosine or precipitating an insoluble color thereon, such as the sulfuric acid salt of an aniline color.

It is an object of the present invention to produce new and improved pigments. A further object is to produce regenerated cellulose pigments. A still further object is the production of an amorphous, very finely divided, thoroughly colored cellulose product. Another object is the production of cellulose pigments which have excellent covering power and are fast to light. An additional object is the production of vat dye-pigmented regenerated cellulose having excellent covering power and high tinctorial power. A further object is the provision of a new and improved process for producing products of the character above described. Another object is the provision of a process for producing colored regenerated cellulose characterized in particular by the fact that the regeneration of the cellulose and the coloring of the regenerated product may be effected in the same reaction medium and with an economy of materials. Other objects will appear hereinafter.

These objects are accomplished according to this invention whereby regenerated cellulose pigments are produced by heating an alkaline aqueous solution of an alkali soluble salt of a cellulose mono-ester of a dicarboxylic acid at a temperature sufficiently high to hydrolyze said mono-ester in the presence of or with the subsequent addition of a coloring material which is stable to hydrolysis, and has an affinity for cellulose. The color compound may be present or added either in solution or in the form of a sol.

The alkali soluble salts of cellulose mono-esters of the dicarboxylic acids upon heating in the presence of an excess of the alkaline reagent over that required to form the salt of the ester are hydrolyzed and regenerated cellulose results. The heating is preferably effected at temperatures above about 50° C. since it has been found that the regeneration of the cellulose is greatly accelerated at higher temperatures.

The cellulose at first appears to be regenerated in the form of fibers but the particles are so finely divided that they are practically colloidal. However, upon standing the regenerated cellulose will settle out and may be filtered. The color compound is preferably present during the regeneration, although, as above indicated, it may be added subsequently to the regenerated cellulose suspension. Another procedure is to separate the regenerated cellulose and treat it with the color compound, for example, by suspending it in another medium in which a suitable dye is present or to which a suitable dye is added. The practically colloidal state of the regenerated cellulose, particularly as initially formed, insures maximum penetration and distribution of the color compound with the utilization of a minimum amount of material.

By the application of the invention it is possible to obtain greatly extended vat dye pigments possessing unusually high tinctorial power, this being preferably effected by adding a solution of the alkali soluble salt of the ester to the vat of a vat dye and heating until the ester is hydrolyzed.

The invention will be further understood, but is not limited, by the following examples, in which the parts are by weight.

*Example I*

To 1000 parts of water at 50° C. are added 5 parts of a chloro-N-dihydro-1:2:2':1'-anthraquinone azine commercially known as Ponsol blue GD, 6.4 parts of sodium hydroxide and 5 parts of sodium hydrosulfite.

In another vessel 21 parts of sodium cellulose phthalate are dissolved in 1000 parts of water. This solution is added to the first, and the whole heated at once to 90° C. with addition of a further 10 parts of sodium hydroxide to complete hydrolysis of the ester. When the hydrolysis is complete the product is cooled, filtered, and washed free from inorganic material. If the dye is not completely oxidized by this procedure, the product may be thrown back into water and air passed through until oxidation is complete. The filtered product may be used as it is or may be dried and ground.

Examples of other oxidizing agents which may be used are mixtures of acetic acid and sodium or potassium dichromate, sodium perborate, and hydrogen peroxide.

*Example II*

To 1000 parts of water are added 6.4 parts of sodium hydroxide and 3 parts Ponsol golden orange RRT double powder (Color Index No. 1097) and the temperature adjusted to 60° C. Five parts of sodium hydrosulfite are now stirred in.

In another vessel, 20 parts of ethyl cellulose hydrogen quinolate are dissolved in 1000 parts of water and enough ammonium hydroxide to make the solution alkaline to litmus and insure complete solution of the cellulose compound. This solution is now added to the vat and the temperature raised to 90° C. until hydrolysis of the cellulose compound is complete. The product is worked up as in Example I.

*Example III*

To 1000 parts of water are added 6.4 parts of sodium hydroxide and 3 parts of Ponsol brilliant green G paste (Color Index No. 1109) and the temperature adjusted to 60° C. Five parts of sodium hydrosulfite are added and after fifteen minutes a solution of 30 parts of cellulose benzoate hydrogen phthalate in 1000 parts of water containing sufficient sodium hydroxide to dissolve all the cellulose compound is poured into the dye vat. Ten parts of sodium hydroxide are added and the temperature raised to 90° C. until hydrolysis of the cellulose compound is complete. The product is worked up as in Example I.

According to procedures similar to those described in Examples I, II, and III, other vat dyes may be employed in the preparation of the dyed regenerated cellulose products. Further examples of such dyes are N-dihydro-1:2:2':1'-anthraquinone azine, flavanthrone, 4:5'-dibenzoylamino-1:1'-dianthraquinonyl carbazole, 4:4'-dibenzoylamino-1:1'-dianthraquinonyl carbazole, 5:5'-dibenzoylamino-1:1'-dianthraquinonyl carbazole, dimethoxy dibenzanthrone, 6:6'-diethoxy-thioindigo, 4:4'-dimethyl-6:6'-diethoxy-thioindigo, 5:5'-dichloro-7:7'-dimethyl-thioindigo, bis-beta-naphthionaphene indigo, and tetrabromoindigo. In the case of the benzoylated anthraquinone derivatives the temperature of hydrolysis should be as low as possible, preferably not substantially above 50° C.

*Example IV*

One hundred parts of sodium cellulose phthalate are dissolved in 1000 parts of water at 20–30° C. In another vessel 10 parts of Pontamine fast red 8BL (Color Index No. 278) are pasted with a little cold water and then sufficient boiling water added to completely dissolve the dye. This solution is then added to that of the phthalate, 10 parts of sodium hydroxide added, the temperature quickly raised to the boiling point and the solution boiled until hydrolysis of the cellulose compound is complete. During this time, 150 parts of sodium chloride are added a little at a time. The product is cooled, filtered, washed with a little water and dried.

Examples of other azo dyes which may be employed are Pontamine sky blue 6BX (Color Index No. 518), Pontamine fast scarlet 4BA (Color Index No. 326), Pontamine violet N (Color Index 394), and Pontamine yellow CH Conc. (Color Index No. 365).

*Example V*

One hundred parts of sodium cellulose phthalate are dissolved in 1000 parts of water. In another vessel 5 parts of Sulfogene navy blue 4RCF (Color Index No. 959) are pasted with a little cold water. A solution containing 10 parts of sodium sulfide in 100 parts of water is added and the liquid brought to the boiling point in a glycerine bath. This solution is then added to that of the cellulose ester together with 10 parts of sodium hydroxide and the whole boiled until hydrolysis is complete. During this time 50 parts of salt are sifted in a little at a time. The solution is cooled while air is blown through, filtered, and the product washed and dried.

Similarly, other sulfur colors may be employed. Further examples of such colors are Sulfogene carbon H Conc. (C. I. #978), Sulfogene yellow G. G. (C. I. #955), Sulfogene green 2B (C. I. #1006) and Sulfogene golden brown G (C. I. #940).

Particularly suitable color compounds are the vat dyes including, among others, anthraquinone, dibenzanthrone, indigo and thioindigo dyes.

The cellulose derivatives employed are characterized by the fact that they can be dissolved and cellulose regenerated from this solution under conditions which render dyeing possible.

These cellulose derivatives are such as may be obtained by the esterification of cellulose material containing a free hydroxyl group with anhydrides of dicarboxylic acids in the presence of tertiary amines such as, for example, pyridine, with or without a catalyst. Usually the resultant compounds contain about one molecule of the dicarboxylic acid for each molecule of the cellulose group. They have the usual characteristics of an acid in that they are soluble in common alkalis and are reprecipitated by the addition of acids. A typical method of preparation is as follows:

Heat 16 parts by weight of cotton linter pulp which has been cut to small squares with 70 parts by weight of phthalic anhydride and 75 parts by weight of anhydrous pyridine to about 100° C. until the pulp has completely disintegrated and the mixture has become a pasty mass. Stirring is desirable to shorten the reaction time. After the reaction has stopped, dissolve the reaction product in from 200 to 500 parts by weight of water in which it forms a viscous solution and from which the cellulose hydrogen phthalate is precipitated out by pouring the solution in a thin stream into dilute mineral acids such as hydrochloric acid. Filter off the cellulose hydrogen phthalate and wash with water. The filtrate contains most of the pyridine which may be recovered from the solution. The solid material may contain some free phthalic acid which precipitates along with the cellulose hydrogen phthalate. This may be removed by drying the solid material at room temperature, grinding it, and extracting with hot water or organic solvents such as ether or chloroform. By analysis, the purified material contains slightly in excess of one phthalic group for each $C_6H_{10}O_5$ group, indicating that it is practically pure cellulose phthalate. This product is soluble in pyridine, in a solution of pyridine in water, in a 5% to 10% ammonium hydroxide solution, or in a 5% NaOH solution.

Other derivatives of the type hereinafter referred to may be prepared in a similar manner.

Especially advantageous results may be obtained with the cellulose mono-esters of dicarboxylic acids forming inner anhydrides such as, for example, the cellulose mono-esters obtained by the reaction of cellulose with phthalic anhydride, succinic anhydride, quinolinic anhydride, adipic anhydride, maleic anhydride and the like, in the presence of tertiary amines. Among the suitable alkali-soluble salts of the cellulose mono-esters may be mentioned the sodium, potassium, lithium and ammonium salts. Any of the alkalis ordinarily used commercially, such as sodium carbonate, sodium bicarbonate, sodium hydroxide and potassium hydroxide may be present in the reaction medium to maintain the desired alkalinity.

The conditions of hydrolysis of the cellulose derivative will vary according to the properties of the derivative, but in general the mildest conditions which will regenerate the cellulose should be used in order to keep the degradation of the cellulose at a minimum.

By the invention greatly extended pigments are obtained which are adapted for a wide variety of uses, such as in paints, printing inks, printing of wall paper, dyeing of plastics and, in general, wherever a very fast and highly extended pigment is needed. This invention provides a means of taking advantage of the exceptional light-fastness of vat dyes and the cost of the dye as a pigment is greatly reduced by the high degree of extension possible. The products may be employed in cases where soluble cellulose pigments are not applicable since regenerated cellulose is not affected by the usual solvents for the nitrocelluloses or cellulose ethers and, in fact, has never been dissolved per se, that is, without a change of chemical structure.

The brilliancy of the pigments of the present invention is probably due in a large measure to the physical state of the cellulose when subjected to treatment with the color compound, since the physical state at regeneration appears to be more receptive to the color treatment than in the usual processes for dyeing fabrics. The products are more extended and more brilliant than pigments obtainable by precipitating a dye on powdered wood.

The expression "solution of a dye" is intended to cover solutions not only of dyes as such, for example, the direct azo dyes, but also of the leuco vat dyes.

As many apparently widely different embodiments of this invention may be made without departing from the spirit and scope thereof, it is to be understood that I do not limit myself to the specific embodiments thereof except as defined in the following claims.

I claim:

1. The process of producing finely divided, amorphous, regenerated cellulose pigments which comprises heating an alkaline aqueous solution of an alkali salt of a cellulose mono-ester of a dicarboxylic acid and a dye for cellulose of the type which can be applied from alkaline solution to a temperature sufficiently high to hydrolyze said mono-ester, whereby cellulosic particles containing the dye are precipitated in finely divided, practically colloidal, but filterable form.

2. The process of claim 1 in which the alkali soluble salt of the cellulose mono-ester of the dicarboxylic acid is an alkali salt of the cellulose mono-ester of phthalic acid.

3. The process of producing finely divided, amorphous, regenerated cellulose pigments which comprises heating an alkaline aqueous solution of an alkali salt of a cellulose mono-ester of a dicarboxylic acid and a reduced vat dye to a temperature sufficiently high to hydrolyze said mono-ester, whereby cellulosic particles containing the dye in finely divided, practically colloidal, but filterable form are precipitated.

4. The process of producing finely divided, amorphous, regenerated cellulose pigments which comprises heating an alkaline aqueous solution of an alkali salt of a cellulose mono-ester of a dicarboxylic acid and a dye for cellulose of the type which can be applied from alkaline solution to a temperature above about 50° C., whereby cellulosic particles containing the dye are precipitated in finely divided, practically colloidal, but filterable form.

5. The process of producing finely divided, amorphous, regenerated cellulose pigments which comprises heating an alkaline aqueous solution of sodium cellulose phthalate and a dye for cellulose of the type which can be applied from alkaline solution to a temperature sufficiently high to hydrolyze the sodium cellulose phthalate, whereby cellulosic particles containing the dye are precipitated in finely divided, practically colloidal, but filterable form.

6. The process of producing finely divided, amorphous, regenerated cellulose vat dye pigments which comprises boiling an alkaline aqueous solution of an alkali salt of a cellulose mono-ester of a dicarboxylic acid forming an inner anhydride and a leuco vat dye whereby cellulosic particles containing the said dye are precipitated in finely divided, practically colloidal, but filterable form, separating the said precipitate, washing it, and subjecting it to oxidation.

7. The process of producing a finely divided, amorphous, fast blue, regenerated cellulose pigment which comprises boiling an alkaline aqueous solution of an alkali salt of cellulose phthalic acid and a leuco chloro-N-dihydro-1:2:2':1'-anthraquinone azine, whereby cellulosic particles containing the said dye are precipitated directly in finely divided, practically colloidal, but filterable form, separating the said precipitate, and then subjecting it to oxidation.

8. The process of producing finely divided, amorphous, pigmented, regenerated cellulose dyed in a blue shade which comprises adding 5 parts of a chloro-N-dihydro-1:2:2':1'-anthraquinone azine, about 6.4 parts of sodium hydroxide and about 5 parts of sodium hydrosulfite to approximately 1000 parts of water at 50° C., mixing this solution with a solution of approximately 21 parts of sodium cellulose phthalate dissolved in 1000 parts of water, heating the mixture to about 90° C. with the further addition of 10 parts of sodium hydroxide, and subjecting the resultant product to oxidation.

FRANK WILLARD JOHNSON.